United States Patent

[11] 3,571,893

| [72] | Inventor | Gaylord B. Haviland<br>Maineville, Ohio |
|---|---|---|
| [21] | Appl. No. | 807,322 |
| [22] | Filed | Mar. 14, 1969 |
| [45] | Patented | Mar. 23, 1971 |
| [73] | Assignee | Big Four Automotive Equipment<br>Corporation |

[54] TIRE STUD GUN WITH ROTARY VALVE
6 Claims, 4 Drawing Figs.

[52] U.S. Cl. .................................................. 29/212
[51] Int. Cl. .................................................. B23q 7/10
[50] Field of Search ........................... 29/212, 212 (T)

[56] References Cited
UNITED STATES PATENTS
3,258,835  7/1966  Boggild et al. .................. 29/212

*Primary Examiner*—Francis S. Husar
*Attorney*—Molinare, Allegretti, Newitt & Witcoff

ABSTRACT: A tire stud gun having a rotary valve thereon at one end of the housing actuated by the handle for selectively actuating the piston therein to force a tire stud into a blind bore in a tire tread.

PATENTED MAR 23 1971
3,571,893
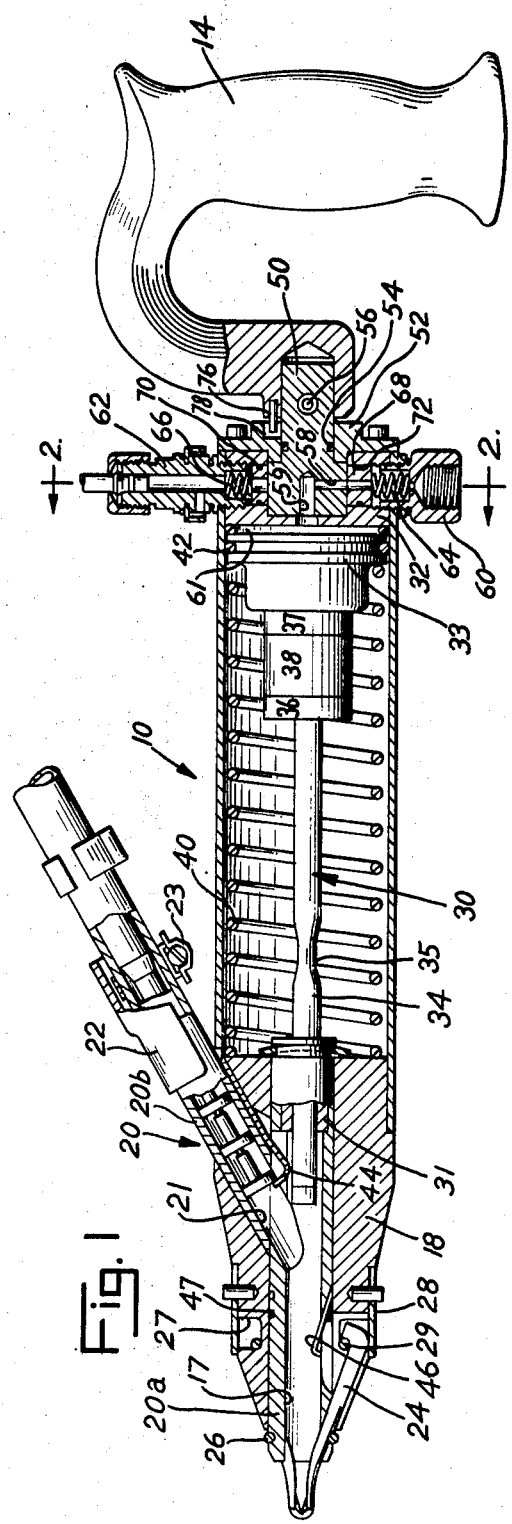
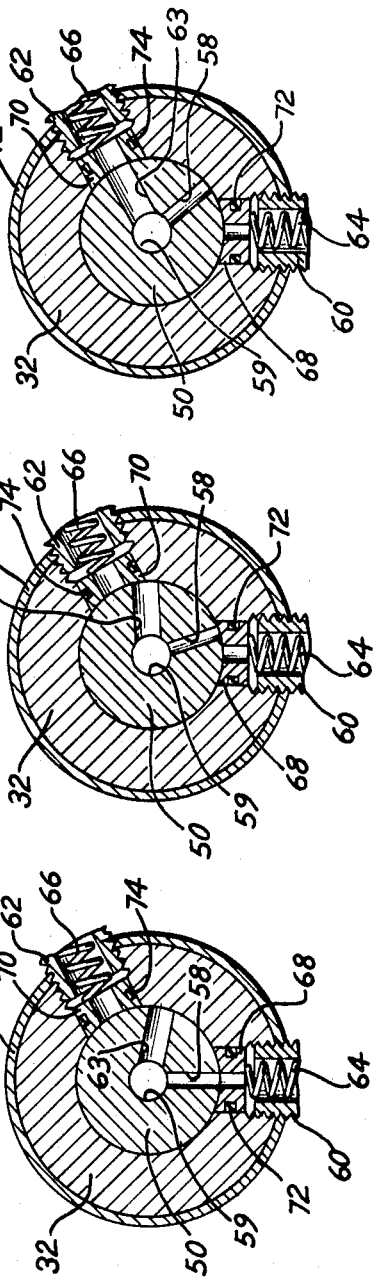
INVENTOR.
GAYLORD B. HAVILAND
BY
ATTORNEYS

TIRE STUD GUN WITH ROTARY VALVE

BACKGROUND OF THE INVENTION

This invention relates to a tire stud gun, and, more particularly, to a tire stud gun incorporating rotary valve means for actuating the piston therein to selectively force a tire stud into a blind bore in a tire tread.

Tire studs comprised of a headed or flanged metal jacket and a hardened carbide insert are being installed in vehicle tire in increasing numbers to increase the traction thereof during Winter operation of the vehicle. The tire studs are inserted into blind bores formed in the treads of such vehicle tires by tire stud guns. Within the generally cylindrical housing of the gun is a piston movable in an outward direction to force a stud into the blind bore and then movable inwardly in the opposite direction preparatory to receiving another stud. Generally, compressed air is used as the power source for actuating the piston outwardly from the gun and either air or a spring may be used to return the piston to its starting position. Separate valves have been used to regulate the flow of compressed air or like power fluid from a suitable source to the piston to actuate the piston and it is desired that the valve for such actuation be incorporated in the gun and that it be done in a simple, inexpensive and convenient manner.

An object of this invention is to provide an improved tire stud gun having rotary valve means thereon which is simple in construction, relatively inexpensive and easy to use.

Another object of the present invention is to provide a tire stud gun having a rotary valve, with biased plungers being provided in the inlet and outlet ports, and with such plungers being contoured to conform to the shape of the rotary valve body connected to the handle so as to provide a tight seal therewith. Other objects and advantages of this invention will be made more apparent hereinafter.

BRIEF DESCRIPTION OF THE DRAWING

The attached drawing illustrates a presently preferred embodiment of the invention in which:

FIG. 1 is a longitudinal cross-sectional view of a tire stud gun embodying the present invention with the inlet and exhaust fittings being shown opposite one another for purposes of descriptive clarity;

FIG. 2 is a cross-sectional view through the rotary valve means, illustrating the position of the valve components with an air path provided from the inlet fitting to the cylinder to force the piston outwardly from the housing;

FIG. 3 is a cross-sectional view similar to FIG. 2, illustrating the position of the valve components when no air is flowing to the cylinder; and FIG. 4 is a cross-sectional view similar to FIGS. 2 and 3, illustrating the position of the valve components with the air path provided from the cylinder to the outlet or exhaust fitting to permit the piston to return to its starting position.

DESCRIPTION OF THE PREFERRED EMBODIMENT

Referring now to FIG. 1, there is illustrated a tire stud gun 10 embodying the present invention. The tire stud gun 10 comprises a tubular housing 12, generally cylindrical in cross section, having a handle means 14 at the rear end thereof and a handgrip (not shown) extending from adjacent the forward end thereof. Secured to the front of the housing 12 is head 18 within which is disposed a barrel or insert tube assembly 20. A shield 22 is secured to the barrel 20 to protect the supply tube 19 from damage. Studs are supplied through the supply tube 19 to the barrel 20 in predetermined headfirst end-to-end relationship.

Extending forwardly from and connected to the head 18 are a plurality of opening fingers or jaws 24 which are adapted to be inserted into an opening or blind bore in a tire tread for spreading the resilient wall defining the blind bore so as to permit insertion of a tire stud headfirst into the blind bore. An annular resilient closing ring 26 is disposed about the opening fingers 24 for biasing the fingers inwardly toward one another. The closing ring 26 is adapted to be retained in a recess in the forward end of the head 18. The opening fingers 24 are retained in the head 18 by means of a locking collar 28. By manually turning the locking collar 28 a quarter turn, release of the collar 28 from the head 18 is permitted and replacement of the opening fingers 24 is then possible.

Reciprocatingly disposed within the tire stud gun 10 is a piston and rod assembly 30 which includes a piston 33 and a rod 34 secured thereto. The rod 34 extends into the head 18 and is journaled in bearing 31. Provided on the piston rod 34 adjacent the piston 33 are a pair of resilient bumpers 36 and 37 separated by a spacer 38. The bumpers 36 and 37 are provided to cushion the shock as the piston rod 34 moves to its leftmost position as seen in FIG. 1 in engagement with the rear end of the barrel 20. The piston 33 is adapted to be biased toward the right to its starting position by the spring 40 disposed about the piston rod 34 within the housing 12.

An O-ring or like resilient seal 42 is provided about the piston 32 to seal between the piston and the interior wall of housing 12.

The opening fingers 24 are generally L-shaped and the small hooked portion at the rear end of each opening finger is secured within a recess 27 in the head 18. A ring 29, made from metal, as, for example, steel, is disposed between the head 18 and the small, hooked end portion of the opening fingers 24 for accommodating some wearing of the parts during operation. As aforenoted, the O-ring or closing ring 26 biases the three opening fingers 24 toward one another. When the locking collar 28 is in its locked position, the hooked end portions of the opening fingers 24 are retained in the recess 27 within the head 18.

The barrel or insert tube assembly 20 forms no part of the present invention and will be only briefly described herein. For further description of the barrel or insert tube assembly 20, reference is made to my copending application Ser. No. 801,714 filed Feb. 24, 1969. Essentially, the barrel 20 includes a longitudinally disposed tubular member 20a and an inlet member 20b secured to the member 20a at an angle with respect thereto. The supply conduit 19 is adapted to be connected to a suitable source of studs that are adapted to be positioned therein in headfirst end-to-end relationship, and is secured to the inlet tube 20b by means of a suitable clamp 23. The barrel 20 includes indexing means comprising a generally flat index spring 44 adapted to extend into the passageway 21 within the inlet tube 20b for restricting the flow of tire studs therethrough. The index spring 44 is positioned so as to be engaged by the piston rod 34 as shown in FIG. 1, so as to extend into the passageway 21 to prevent further movement of studs from the member 20b into the member 20a. The piston rod 34 includes a reduced or recessed portion 35 and when the head of the index spring 44 moves into the recessed portion 35 as a result of the inherent bias in the spring 44, the tip of the spring 44 will be outside of the passageway 21 and a tire stud will be permitted to enter the passageway 17 within the tubular part 20a of the insert tube assembly 20. The reduced portion 35 therefor functions as a cam means for actuating the index spring 44 during movement of the piston rod 34.

Within the passageway 17 of the tubular part 20a are three positioning springs 46 that are spaced radially 120° from one another for suitably retaining in position a tire stud that has moved from the passageway 21 into the passageway 17. The O-ring 47 disposed about the body portion 20a and the three positioning springs 70 retains the springs 70 in the position shown in FIG. 1.

Secured to the rear end of the cylinder 12 is the rotary valve means of the present invention. The rotary valve means includes a valve body 50 rotatably disposed within a central bore in the valve housing or end cap 32 and retained in position by means of the cap plate 52. A resilient seal 54 is provided between the valve body 50 and the cap plate 52. The handle 14 is secured to the valve body 50 as, for example, by means of a roll pin 56 so as to rotate the valve body 50 with respect to the end cap 32 to connect passages or transverse bores in the valve body 50 selectively between the inlet fitting 60 and the outlet fitting 62. As shown, the inlet fitting 60 and the outlet fitting 62 are threadedly secured to the valve housing or end cap 32 and are adapted to bias springs 64 and 66, respectively, against the plungers 68 and 70, respectively, for sealing the plungers 68 and 70 with respect to the rotary valve body 50.

The exterior sealing surface of the valve body 50 is cylindrical and the mating surfaces of the plungers 68 and 70 are complementary to the exterior surface of the valve body 50 to readily accommodate desired rotation and sealing of the valve body throughout its rotation. An O-ring 72 is provided in a recess in the exterior of the plunger 68 to seal between the plunger and the wall of the bore within the valve housing 32 within which the plunger is movable. A similar seal 74 is provided in a recess in the exterior of the plunger 70 to seal between the plunger 70 and the wall of the bore in the end cap 32 within which the plunger 70 is movable. The plungers 68 and 70 are preferably made from a plastic, as, for example, polytetrafluorethylene.

The stop 76 which is affixed to the handle 14 cooperates with a recess 78 in the cap plate 52 to limit the rotation of the handle 14 and the rotary valve body 50 connected thereto within the valve housing or end cap 32.

Turning now to FIGS. 2, 3 and 4 there is illustrated cross-sectional views of the rotary valve means during different operating positions. In FIG. 2, it is seen that the transverse passageway 58 in the valve body 50 is aligned with the inlet opening that communicates with the inlet fitting 60 such that air may pass from the inlet opening through passageway 58 and longitudinal passageway 59 into the chamber 61 behind the piston 33 for urging the piston 33 forwardly and outwardly from the head 18. The transverse passageway 63 in the valve body is dead-ended at this time since it engages an imperforate wall of the valve housing or end cap 32.

Further rotation of the handle 14 and the valve body 50 connected thereto by approximately 15, as shown in FIG. 3, will move the passageway 58 out of alignment with the opening through the plunger 68. Passageway 63 is out of alignment with the opening through plunger 70. In this position air may neither enter the valve body 50, nor exit from the valve body 50.

In FIG. 4, there is illustrated the position of the valve body 50 with the transverse passageway 63 communicating with the opening in the plunger 70 so as to communicate the chamber 61 in the housing 12 to the exhaust or outlet fitting 62 through the opening in the plunger 70. In this position, the rotary valve has been rotated approximately 80° and the air may be exhausted from the rear of the piston 33, that is from chamber 61 through axially disposed passageway 59 and radially disposed passageway 63 in valve body 50, and then through the opening in the plunger 70 to the exhaust opening which communicates with outlet fitting 62, so as to permit the plunger 70 to the exhaust opening which communicates with outlet fitting 62, so as to permit the piston 33 to be returned to its starting position by the spring 40.

The functioning of the tire stud gun of the present invention will now be briefly described. In normal use, the gun jaws or opening fingers 24 are inserted to the bottom of the blind bore in the tire tread and the handle 14 is rotated to properly position the valve body 50 to communicate the chamber 61 with the supply pressure from inlet fitting 60 to force the piston 33 forwardly and outwardly so as to push a tire stud into a blind bore in the tire tread. With the tire stud gun 10 retained in position, the operating handle 14 is turned and the tire stud gun is allowed to push itself out of the blind bore as the tire stud is inserted. This will permit correct alignment and installation of the tire stud to the proper depth. After the tire stud gun 10 has ejected the stud and pushed itself out of the blind bore, then the handle is rotated to the position shown in FIG. 4 so as to communicate the chamber 61 with the outlet fitting 62 to exhaust pressure from the chamber 61. Then the handle may be returned to the neutral starting position as shown, for example, in FIG. 3.

There has been provided by the present invention an improved tire stud gun incorporating rotary valve means for selectively controlling the flow of inlet air to the chamber behind the piston and for exhausting or evacuating the air from said chamber. The outlet fittings 60 and 62 are detachably secured to the end cap 32 and each is adapted to support a bias spring that urges a plunger into sealing engagement with the rotary valve body 50 that is operatively secured to the handle. The plungers 68 and 70 are provided with peripheral seals for sealing with the walls of the bores in end cap 32 within which the plungers are disposed and the internal surfaces of the plungers which engage and cooperate with the exterior surface of the valve body 50 are formed complementary to the cylindrical exterior surface of the valve body. The rotary valve arrangement is easy to assemble initially and is susceptible of ready repair, should that be necessary during use. A tight sealing relationship is maintained between the plungers and the rotary valve body at all times throughout rotation of the valve body 50 with respect to the end cap 32.

While I have described a preferred embodiment of my invention, it will be understood that the invention is not limited thereto, but may be otherwise embodied within the scope of the following Claims.

I claim:

1. In a tire stud gun for inserting a tire stud into a blind bore in a vehicle tire, said tire stud gun including housing means communicating with a supply of studs and having a handle thereon, piston means including piston and a piston rod for moving a stud from the housing and pushing same into the blind bore in the vehicle tire, a chamber being defined between the piston and said housing means, said piston actuator being urged outwardly from the housing by introduction of pressure fluid into said chamber and being returned to its starting position by spring means, and control means for actuating the piston means, characterized by the control means comprising an end body on said housing means having an inlet opening and an exhaust opening, there being a central bore in said end body, a rotary valve body disposed in said central bore for rotation therein, a longitudinal bore in said rotary valve body and a first and a second transverse bore communicating therewith, the longitudinal bore being adapted to communicate with said chamber and plunger means in said inlet opening and said exhaust opening in sealing relationship with the exterior surfaces of said rotary valve body.

2. A tire stud gun as in claim 1 wherein the exterior surface of the rotary valve means is cylindrical and the plunger means have a surface complementary to that of said exterior surface.

3. A tire stud gun as in claim 2 wherein there is a plunger in said inlet opening and a plunger in said outlet opening, and a spring for biasing each plunger toward the rotary valve body.

4. A tire stud gun as in claim 1 wherein seal means are provided on the plunger means for sealing between the plunger means and the respective walls defining the inlet opening and the outlet opening.

5. A tire stud gun as in claim 1 wherein said handle is secured to said rotary valve body for rotating same.

6. A tire stud gun as in claim 1 wherein the first and second transverse bores are arranged such that when the first transverse bore is positioned in alignment with said inlet opening pressure fluid is communicated to said chamber and when said second transverse bore is positioned in alignment with said exhaust opening, pressure fluid is exhausted from said chamber.